United States Patent Office 3,409,783
Patented Nov. 5, 1968

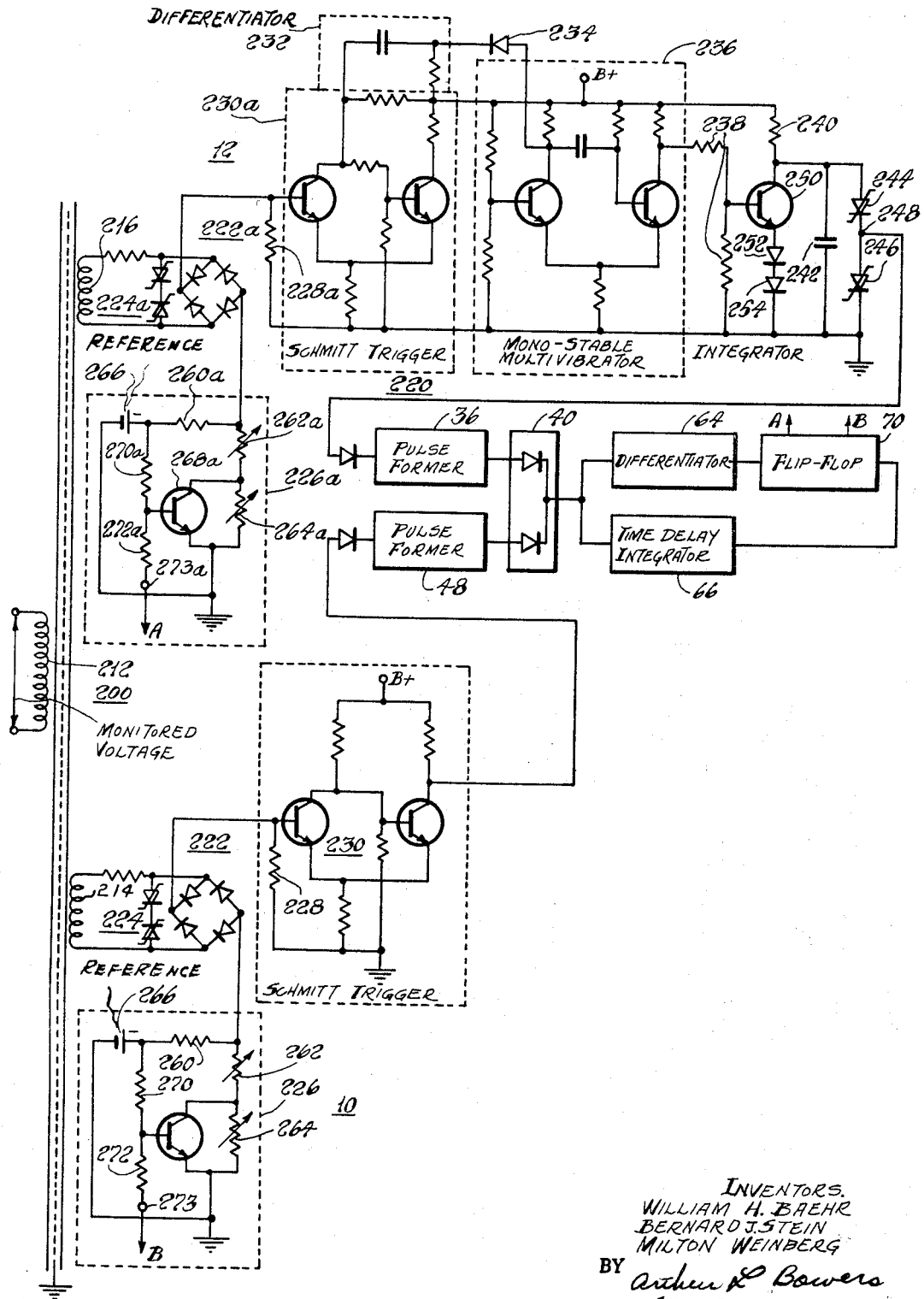

3,409,783
HIGH-LOW VOLTAGE AMPLITUDE MONITOR
William H. Baehr, Uniondale, Bernard J. Stein, Jamaica, and Milton Weinberg, Plainview, N.Y., assignors, by mesne assignments, to the United States of America as represented by the Secretary of the Navy
Filed Apr. 20, 1965, Ser. No. 449,661
3 Claims. (Cl. 307—64)

ABSTRACT OF THE DISCLOSURE

An overvoltage circuit and an undervoltage circuit that separately and continuously monitor the voltage amplitude of an alternating power supply at a generator, load or anywhere between, and more particularly, a voltage monitoring circuit for generating an electrical output that is usable for control purposes, e.g., to switch on a standby power supply substitute for the regular power supply when the monitored voltage is outside predetermined overvoltage and undervoltage limits. For each voltage peak of either polarity that exceeds a selected overvoltage limit, the overvoltage circuit generates a pulse. On the other hand, when the voltage peaks of either polarity do not come up to the selected undervoltage limit, the undervoltage circuit generates a different output voltage. The overvoltage and undervoltage circuits have a stable operating condition defining predetermined tolerance limits for the amplitude of the monitored voltage and have another operating condition activated when the monitored voltage falls outside those tolerance limits and defining narrowed tolerance limits for the monitored voltage which must be satisfied before the stable operating condition is restored. In other words the circuits revert to a transitory operating condition following overvoltage or undervoltage of the monitored voltage and perform a control function in the process, and remain in that condition until the continuously monitored voltage stabilized within the narrowed tolerance limits of the other operating condition for a predetermined number of successive peaks at which time the circuits revert to their original stable operating condition.

---

Control instruments such as self-synchronous (synchro) devices, and relays require supply voltages that are within narrow tolerance limits to perform their functions accurately.

An object of this invention is to provide a circuit for continuously monitoring the voltage amplitude of an alternating power supply and for generating an electrical output usable for control purposes immediately following reduction or increase of the voltage amplitude beyond predetermined lower or upper limits.

A further object is to provide a circuit for continuously monitoring the voltage amplitude of an alternating current power supply and for generating an electrical output immediately following reduction of the voltage amplitude below a predetermined lower limit.

A further object is to provide a circuit for continuously monitoring the voltage amplitude of an essentially sinusoidal power supply of a frequency on the order of several hundred cycles per second and for generating an output immediately following reduction or increase of the voltage amplitude beyond predetermined lower and upper limits.

A further object is to provide a circuit in accordance with the preceding objects that is reliable, compact, inexpensive for the function performed, low power, easy to fabricate and generally superior to voltage monitoring devices available heretofore.

Other objects and advantages will appear from the following description of an example of the invention, and the novel features will be particularly pointed out in the appended claims.

This invention includes a high voltage circuit and a low voltage circuit that separately and continuously monitor the same voltage. For each voltage peak in either direction that exceeds a selected maximum limit, the high voltage circuit generates a pulse. On the other hand, whenever a voltage peak does not come up to the selected minimum limit, the low voltage circuit generates a voltage. Both circuits have a stable operating condition corresponding to normal power supply voltage, i.e., the voltage amplitude monitored falls within the predetermined upper and lower limits or tolerance limits relative to a predetermined nominal voltage amplitude. Both circuits have another operating condition wherein the overvoltage tolerance is reduced and the undervoltage tolerance is reduced. Both circuits revert to the second operating condition following overvoltage or undervoltage and remain in that condition until the monitored voltage falls within the reduced tolerances of the second operating condition. Then both circuits are returned to their former stable operating condition and the original voltage tolerances. This mode of operation precludes repeated switching between the regular power supply and a standby power supply. The high and low voltage monitor continuously monitor the regular supply; the standby power supply continues in use until the voltage amplitude of the regular power supply returns to the nominal voltage within the narrowed tolerance limits and remains within those narrowed limits for an interval indicative of stable operation at the nominal voltage.

The single figure is a schematic circuit diagram of a preferred embodiment of this invention.

This invention is related to and operable with the invention disclosures in the United States patent applications Ser. Nos. 449,659 and 449,662 of the same inventors filed of even date and assigned to the United States Government.

A step-down transformer 200 that comprises a primary 212 and secondaries 214 and 216 couples the input of high voltage detector circuit 10 and the input of low voltage detector circuit 12 to the power supply being monitored. If there is more than one phase, identical circuitry is utilized for each phase of the power supply being monitored.

The high voltage circuit 10 and the low voltage circuit 12 each include full-wave rectifiers 222, 222a. Voltage regulators 224, 224a operable as peak voltage limiters couple the inputs of the full wave rectifiers to the transformer secondaries, for protecting the circuit elements. Threshold bias circuits 226, 226a are connected in series with the outputs of the respective full-wave rectifiers. Metering resistors 228, 228a are connected in series with the outputs of the full-wave rectifiers and their respective threshold circuits. The inputs of Schmitt trigger circuits 230 and 230a are connected across the metering resistors 228 and 228a for squaring any pulses developed across the metering resistors 228 and 228a.

The voltage regulator circuits 224 and 224a each consist of back-to-back Zener diodes, or the like, in series with a voltage dropping resistor connected across the respective transformer secondaries; they function as voltage limiters to protect the circuit elements, particularly the input transistors of the Schmitt trigger circuits from dangerously high overvoltage. This type of voltage regulator circuit is described on page 44 of the Zener Diode Handbook, published by International Rectifier Corporation, El Segundo, Calif., copyright 1960.

Schmitt trigger circuits are described in various handbooks among which is the Transistor Manual, published by General Electric, copyright 1962. A Schmitt trigger circuit is a regenerative bistable circuit whose state depends on the amplitude of the input voltage; in the illustrated embodiment these circuits serve to square pulse inputs thereto and to shift signal level. In circuits 230 and 230a, the input transistor is normally cut off and is rendered conductive to cut off the output transistor only when a positive voltage appears across the metering resistor 228 or 228a.

The output of the high voltage circuit 10 is at the collector of the output transistor of the Schmitt trigger circuit 230 which collector is normally close to ground potential but rises to B+ whenever a positive voltage appears across metering resistor 228.

In the low voltage circuit 12, a differentiator 232 is connected across the collector resistor of the input transistor of circuit 230a. When the monitored voltage is normal, the circuit 230a is triggered during each half cycle causing the collector voltage of the input transistor to drop from B+ to approximately ground potential and then returns to B+. The differentiator provides a negative spike and a positive spike essentially coincident with the leading and trailing edges respectively of each negative pulse developed across the collector resistor of the input transistor.

A diode 234 conducts only the negative spikes from the differentiator 232 to trigger a monostable multivibrator 236. The output transistor of the monostable multivibrator is normally conductive whereby the collector of its output transistor is at approximately ground potential. In response to each negative trigger spike conducted by diode 234 to monostable multivibrator 236, a positive output pulse appears at the collector of the output transistor of monostable multivibrator 236. A voltage divider 238 is connected across the output of the monostable multivibrator 236. For each half cycle of the voltage being monitored that exceeds the lower limit of amplitude, there appears at the output of voltage divider 238 a positive pulse of fixed height and length, the length being less than the length of one-half cycle of the voltage being monitored.

A resistor 240 and a capacitor 242 having a time constant on the order of twice the period of the monitored voltage is connected in series between B+ and ground. Two Zener diodes 244 and 246 are connected across the capacitor 242 and operate as voltage limiters and as a threshold whereby only when the voltage on capacitor 242 reaches the threshold defined by the Zener diodes does an output voltage appear at the output terminal 248 between the Zener diodes; when an output voltage does appear between the Zener diodes, it has one specific level. The time constant and the values of resistor 240 and capacitor 242, and the ratings of the Zener diodes determine the time required for charging the capacitor 242 sufficiently to obtain an output at terminal 248; it is desirable to select these parameters to obtain an output in no less than the time corresponding to one cycle of the voltage being monitored. The capacitor 242 is shunted by the collector and emitter terminals of a transistor 250 in series with two diodes 252 and 254. The voltage on the base of the transistor 250 is raised to a level at which transistor 250 operates at saturation and completely discharges capacitor 242 during each half cycle whenever the amplitude of the voltage being monitored exceeds the minimum tolerance limit.

The outputs of the high voltage circuit 10 and the low voltage circuit 12 are coupled by pulse formers 36, 48 and OR gate 40 to the inputs of differentiator 64 and time delay integrator 66. A flip-flop 70 is connected to the outputs of differentiator 64 and integrator 66. The flip-flop has two outputs. Each output has two voltage states namely approximately B+ and approximately ground potential. When one of the outputs is at B+, the other is at ground and conversely. The outputs of the flip-flop are operable for switching between the regular power supply and the standby power supply, not shown. The outputs of the flip-flop are also connected to the threshold circuits 226 and 226a to narrow the upper and lower tolerance limits after the voltage being monitored falls outside the tolerance limits. Pulses continue to appear at output of the OR circuit 40 until the regular supply voltage falls within the narrowed tolerance limits. As long as the voltage remains outside the narrowed tolerance limits, the time delay integrator is prevented from triggering the flip-flop to its other state. When the regular supply voltage does fall within the narrowed tolerance limits and continues between those limits for a predetermined time, the time delay integrator 66 triggers the flip-flop back to its former state to return the voltage tolerance limits to their earlier levels, and to switch back from the standby power supply to the regular power supply.

Disregarding subscript a, each threshold circuit includes a voltage divider network that has a fixed resistor 260, two variable resistors 262 and 264, and a regulated direct current source 266 in series; the source 266 is illustrated as a battery for the sake of simplicity. One output terminal of the full-wave rectifier is joined to the connection between resistors 260 and 262. The emitter and collector of a transistor 268 are connected to opposite ends of resistor 264. The base of the transistor is connected to a second voltage divider that includes resistors 270 and 272. The output terminals of the flip-flop are connected to the ends 273 of resistor 272. The transistor 268 is switched by the flip-flop between two states, saturation and cutoff. When the transistor is cut off, threshold voltage is higher and when the transistor is operating at saturation, the threshold voltage is lower. When the monitored voltage is normal, i.e., between the upper and lower tolerance limits, the flip-flop provides the positive voltage to terminal 273a and essentially ground potential to terminal 273; when the monitored voltage falls outside the tolerance limits and the flip-flop changes state, terminal 273a is lowered to essentially ground potential and the voltage on terminal 273 is elevated.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A voltage amplitude monitor for use with two alternating power supplies comprising:
   a high voltage detector circuit coupled to one of said power supplies and operable to provide an output pulse in response to any half cycle of the voltage output of the one power supply wherein the amplitude exceeds a predetermined maximum level,
   a low voltage detector circuit coupled to said one of said power supplies and operable to provide a steep rise voltage output in the absence of a predetermined plurality of successive half cycles of amplitude lower than a predetermined minimum level,
   means for switching power supplies having two outputs and two stable states of operation, said means being operable in one state to provide one potential at one of said outputs and another potential at the other output and operable in its other state to essentially reverse the potentials on its outputs,
   means coupling output voltage delivered by either of the detectors to said two output means and for supplying a voltage for switching the switching means from one state to the other in response to an output voltage from either one of the detectors and for supplying a voltage for switching states again in the absence of a voltage output from the detectors for a predetermined interval since delivering the last voltage output,
   means coupling the output potentials of said switching means to said high voltage detector and said low voltage detector to establish two different sets of maximum and minimum voltage levels for the two states of the switching means to narrow the range of maximum and minimum voltage levels to which the voltage amplitude must return after having deviated beyond the wider range set of maximum and minimum voltage levels before said switching means is switched back to its state prior to deviation of the voltage amplitude beyond the wider range set of voltage levels.

2. A low voltage detector for a sinusoidal power supply comprising:

a full wave rectifier having input terminals for monitoring the sinusoidal voltage and having output terminals, means for providing a selected threshold voltage connected in series with one of the output terminals of the full wave rectifier, a metering resistor connected in series between the the other output terminal of the full wave rectifier and the threshold voltage means, an R-C circuit including a resistor, capacitor, and direct current supply, in series, output means connected across the capacitor for providing a predetermined steep rise voltage output when the voltage across the capacitor exceeds a predetermined level, the time constant of the resistor and capacitor, and the voltage of the direct current supply being of magnitudes to charge the capacitor to a voltage level sufficient for said output means to provide said predetermined voltage output in a time interval on the order of the period of sinusoidal power supply voltage being monitored, means responsive to the voltage across the metering resistor for essentially short circuiting and discharging said capacitor during each half cycle of the monitored sinusoidal power supply voltage wherein the amplitude exceeds the threshold voltage.

3. A low voltage amplitude monitor as defined in claim 2 wherein said means responsive to the voltage across the metering resistor comprises:

a Schmitt trigger circuit connected to the metering resistor and operable to square each pulse developed across the metering resistor, a monostable multivibrator, a differentiator coupled to the Schmitt trigger circuit, unidirectional means for delivering one spike pulse from the differentiator to the monostable multivibrator for each pulse from the Schmitt trigger circuit, which spike pulse is approximately coincident with leading edge of each pulse developed by the Schmitt trigger circuit, for triggering the monostable multivibrator, and normally nonconductive means shunting said capacitor and operable to discharge said capacitor in response to each pulse from said monostable multivibrator.

References Cited

UNITED STATES PATENTS

| | | | |
|---|---|---|---|
| 2,914,704 | 11/1959 | Nesler | 307—94 |
| 3,105,920 | 10/1963 | Dewey | 317—31 X |
| 3,243,658 | 3/1966 | Blackburn | 317—31 |
| 3,280,374 | 10/1966 | McCartney | 317 X |

ROBERT K. SCHAEFER, *Primary Examiner.*

H. J. HOHAUSER, *Assistant Examiner.*